J. C. Cline,
Scroll Sawing Machine.
N° 22,705.   Patented Jan. 25, 1859.
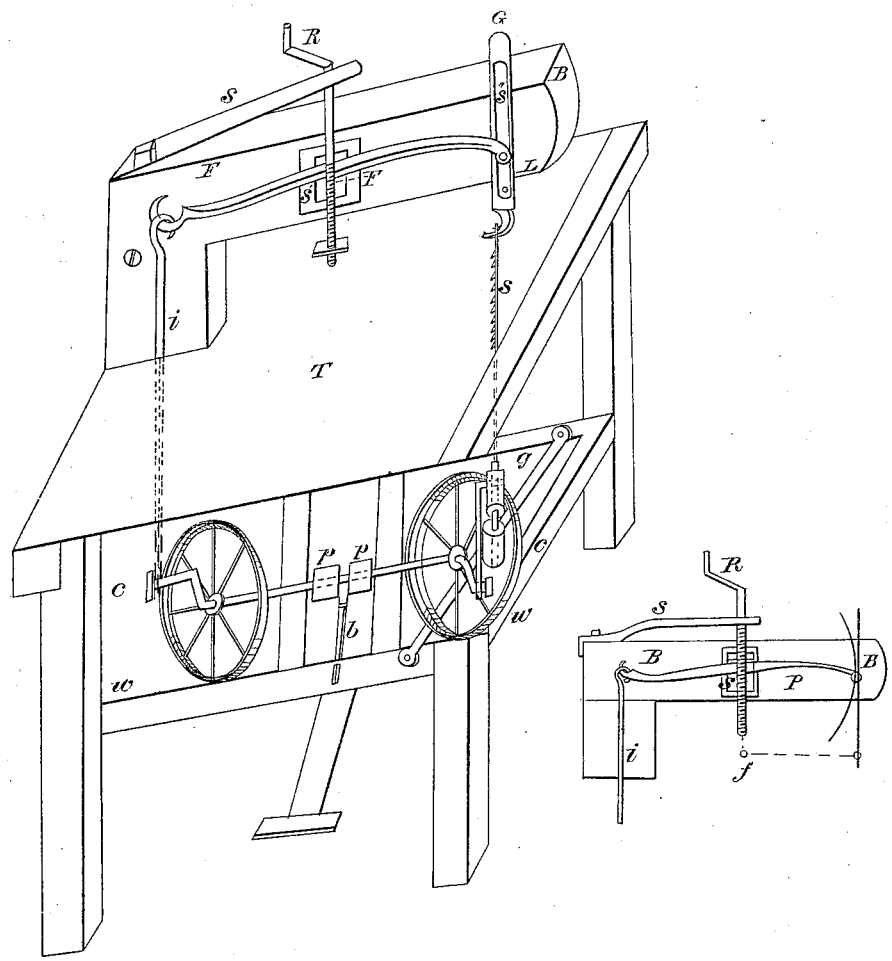
Witnesses:
M. Semple
E. M. Winans
Inventor:
John C Cline

UNITED STATES PATENT OFFICE.

JOHN C. CLINE, OF PHILADELPHIA, PENNSYLVANIA.

METHOD OF HANGING RECIPROCATING SAWS.

Specification of Letters Patent No. 22,705, dated January 25, 1859.

*To all whom it may concern:*

Be it known that I, JOHN C. CLINE, of the city and county of Philadelphia, State of Pennsylvania, have invented a new, useful, and Improved Method of Arranging the Pitman-Bar for Reciprocating Scroll-Saws; and I do hereby declare that the following is a full, clear, and exact description of the construction of the same, referring to the drawings, representing a perspective view of the complete machine.

In the drawing T represents a strong table or saw bench well braced and bolted together, $p$, $p$, $p$, the means of applying power either through the pulleys or with steam or by the crank $p$ through the foot for light work.

W, W', are two balance wheels, C cranks attached to fly wheels, $i$ $i$ iron rod connecting one end of the pitman bar P with the crank wheel W while the other end of the bar is connected by means of a link L with the saw S.

F represents the fulcrum upon which the pitman bar works.

Now when a pitman bar or lever is made to move on a fixed fulcrum its natural course would be that the ends should move in the segment of a circle but if the fulcrum can be made to descend with the descending end of the lever that end will move in a straight line, see Fig. 2, where P indicates the pitman bar, R the regulating screw, F the fulcrum and S the spring holding the fulcrum suspended. Now when power is applied to force the saw down the fulcrum descends in a straight line to $f$ and enables the saw end of the pitman bar to descend in nearly a straight line also thus greatly lessening the friction on the guides and essentially lightening the labor of the foot if a treadle be used or diminishing the cost of steam if that power be applied and prevents the trembling of the saw from irregular pressure on the guides. For this reason I have applied to the foregoing described saw bench the strong spring S by which the fulcrum F is suspended so as to descend through the slot S' in the beam B and capable of being regulated by the regulating screw R passing through the beam B.

G is a trap guide to the slide S", S being the saw working through the table T, the lower slide $g$ being protected from the saw dust by means of a movable cap at $g$ and attached to the crank wheel W'.

Having thus described my invention what I claim and desire to secure by Letters Patent is—

The employment of a spring either straight or spiral to suspend the fulcrum of pitman bars or other reciprocating levers in the manner substantially set forth in the foregoing specification.

JOHN C. CLINE.

Witnesses:
E. M. WINAN,
W. G. CONNORS.